United States Patent
Jung et al.

(10) Patent No.: US 7,916,237 B2
(45) Date of Patent: Mar. 29, 2011

(54) LIQUID CRYSTAL DISPLAY DEVICE

(75) Inventors: Jai-sang Jung, Suwon-si (KR);
Tae-yong Kim, Suwon-si (KR);
Min-seop Kim, Suwon-si (KR); Jae-ho Jung, Suwon-si (KR); Chi-hoon Lee, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 35 days.

(21) Appl. No.: 12/219,216

(22) Filed: Jul. 17, 2008

(65) Prior Publication Data
US 2009/0073342 A1 Mar. 19, 2009

(30) Foreign Application Priority Data

Sep. 13, 2007 (KR) .................. 10-2007-0093054

(51) Int. Cl.
*G02F 1/1333* (2006.01)
*G02F 1/1335* (2006.01)

(52) U.S. Cl. ........................................ 349/58
(58) Field of Classification Search .............. 349/58, 349/60, 67, 69, 97.3
See application file for complete search history.

(56) References Cited

U.S. PATENT DOCUMENTS

| | | | |
|---|---|---|---|
| 5,432,626 A | 7/1995 | Sasuga et al. | |
| 6,149,053 A | 11/2000 | Chatterton et al. | |
| 2002/0135727 A1 | 9/2002 | Nakaminami et al. | |
| 2006/0044746 A1 | 3/2006 | Kim et al. | |
| 2006/0056202 A1 | 3/2006 | Jung et al. | |
| 2006/0158897 A1 | 7/2006 | Choi et al. | |
| 2007/0229731 A1 | 10/2007 | Lan et al. | |

FOREIGN PATENT DOCUMENTS

| | | |
|---|---|---|
| CN | 1808241 A | 7/2006 |
| EP | 1903374 A1 | 3/2008 |
| GB | 2433346 A | 6/2007 |
| JP | 2000-019508 | 1/2000 |
| JP | 2001-059961 | 3/2001 |
| JP | 2001-272659 | 10/2001 |
| JP | 2002-258251 | 9/2002 |
| JP | 2004-186080 | 7/2004 |
| JP | 2006-047589 | 2/2006 |
| JP | 2006-093072 | 4/2006 |
| JP | 2007-011361 | 1/2007 |
| KR | 10-2003-0028970 | 4/2003 |
| KR | 10-2006-0026605 | 3/2006 |
| KR | 10-2006-0047025 | 5/2006 |

OTHER PUBLICATIONS

*Office Action* from the KIPO issued in Applicant's corresponding Korean Patent Application No. 2007-0093054 dated Jun. 25, 2008.
The extended European Search Report issued in corresponding European Patent Application No. 08164114.4 on Dec. 8, 2008.
Office action from Chinese Patent Office issued in Applicant's corresponding Chinese Patent Application No. 2008102159924 dated Nov. 27, 2009 and Request for Entry of the Accompanying Office Action.
Chinese Office Action dated Sep. 21, 2010 of the Chinese Patent Application No. 200810215992.4, which claims priority of the corresponding Korean Priority Application No. 10-2007-0093054, together with a Request for Entry.
Japanese Office Action issued by Japanese Patent Office on Jan. 4, 2011 in corresponding Japanese Patent Application No. 2007-292347, together with Request for Entry of the Accompanying Office Action.

*Primary Examiner* — Brian M. Healy
*Assistant Examiner* — Mary A El-Shammaa
(74) *Attorney, Agent, or Firm* — Robert E. Bushnell, Esq.

(57) ABSTRACT

A liquid crystal display device has a reinforced rigidity against external impacts. The liquid crystal display device includes a liquid crystal display panel and a backlight assembly; and a bottom chassis disposed to receive the liquid crystal display panel and the backlight assembly, the bottom chassis having a projection projected from an inner surface of the bottom chassis towards the liquid crystal display panel and the backlight assembly.

12 Claims, 6 Drawing Sheets

| | Load at the time of breaking (N) | Increasing rate |
|---|---|---|
| 0 Projection part | 25.14 | 0.00% |
| 5 Projection part | 30.39 | 20.8% |

|  | 0 Projection part(Mpa) | 5 Projection part(Mpa) | Rigidity increased rate |
|---|---|---|---|
| End of upper substrate | 40.87 | 26.78 | 53% |
| Internal of upper substrate | 66.07 | 44.43 | 49% |
| End of pad part | 24.52 | 19.24 | 27% |
| Internal of pad part | 55.69 | 44.01 | 27% |
| End of lower substrate | 37.89 | 21.92 | 73% |
| Internal of lower substrate | 50.33 | 29.28 | 72% |
| Integrated circuit (IC) | 67.55 | 44.24 | 53% |

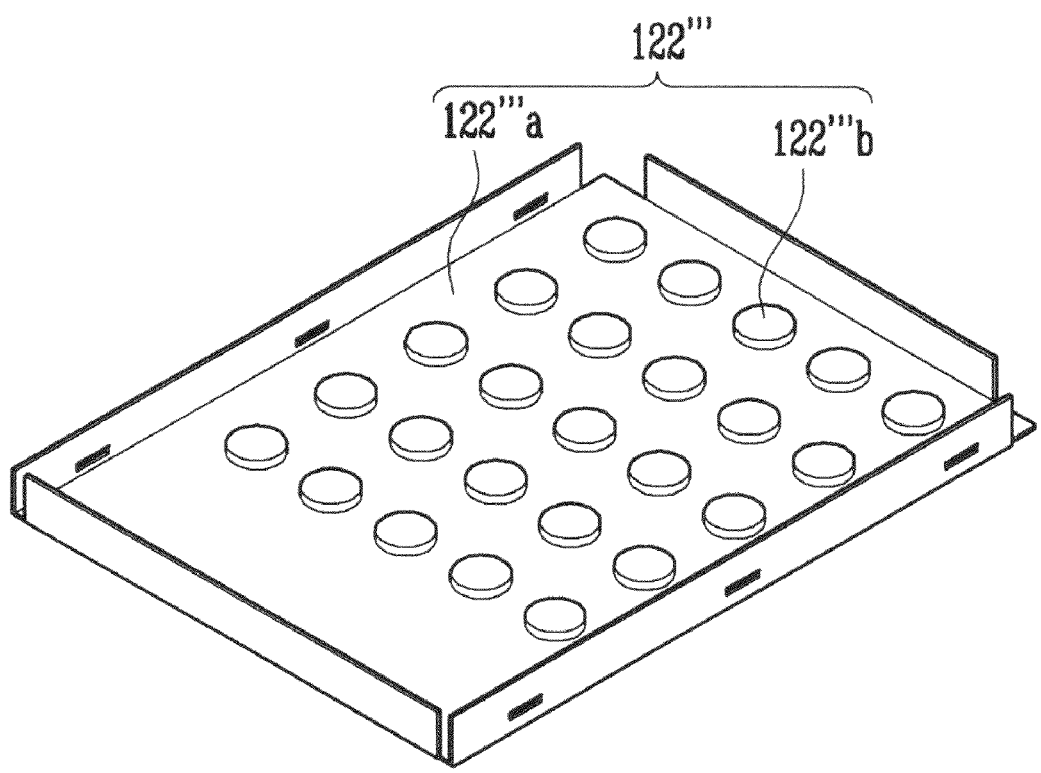

US 7,916,237 B2

LIQUID CRYSTAL DISPLAY DEVICE

CLAIM OF PRIORITY

This application makes reference to, incorporates the same herein, and claims all benefits accruing under 35 U.S.C. §119 from an application for LIQUID CRYSTAL DISPLAY DEVICE earlier filed in the Korean Intellectual Property Office on 13 Sep. 2007 and there duly assigned Serial No. 2007-0093054.

BACKGROUND OF THE INVENTION

1. Field of the Invention

The present invention relates to a liquid crystal display device, and more particularly, to a liquid crystal display device with an reinforced rigidity against external impacts.

2. Description of the Related Art

As a liquid crystal display (LCD) device may be designed compact in size and light weighted in weight, the LCD device may be driven by a lower power and thus a market demand of LCD devices has been rapidly increased for portable equipments, as well as in monitors and televisions.

In such liquid crystal display devices, slimness of LCD devices has been requested and realized in order to contemplate the trend of the compact and slim designs of portable equipments. For example, it is possible to remove a window which is unnecessary for driving the LCD devices.

Because of the removal of the window as stated above for achieving a slim LCD device, however, the LCD panel exposed to the exterior of the LCD device may be easy to be damaged by an external force and impact such as a falling, and may be easily exposed to the environment from which external loads may be applied. Therefore, the lifetime of the liquid crystal display device may be shorten and the reliability of the LCD device may be degraded.

Therefore, by achieving an endurable liquid crystal display panel against increased external loads in a module state (i.e., a state where all of the elements are completely assembled), the rigidity against external loads may be improved in a static state (i.e., a state where external impacts are not applied to the LCD device except for gravity) and the improvement of the rigidity for the load is sought in an operative state (i.e., a dynamic sate where dynamic impacts are applied to the LCD device), such as a falling, and thus the entirely reinforced rigidity of the liquid crystal display device has been requested.

SUMMARY OF THE INVENTION

It is therefore one object of the present invention to provide an improved liquid crystal display device to overcome the problems stated above, such as the shorten lifetime and the degraded reliability of the LCD device.

It is another object of the present invention to provide a LCD device with a reinforced rigidity against external impacts.

In one embodiment of the present invention, a liquid crystal display device includes a liquid crystal display panel and a backlight assembly; and a bottom chassis disposed to receive the liquid crystal display panel and the backlight assembly, the bottom chassis including a projection protruding from an inner surface of the bottom chassis towards the liquid crystal display panel and the backlight assembly.

The projection may be formed on a portion of the inner surface of the bottom chassis, with the portion of the inner surface of the bottom chassis corresponding to a display area (i.e., active area) of the liquid crystal display panel.

The projection has an upper surface formed to immediately physically contact to a constituent of the backlight assembly, the constituent being disposed with the greatest distance from the LCD panel among constituents of the backlight assembly.

The liquid crystal display device further includes a flexible printed circuit board mounted with a pad formed on one side of the LCD panel is curved to be extended from the pad to the inner surface of the bottom chassis, and the flexible printed circuit board may be disposed without overlapping with the projection. The height of the projection may be set same as or smaller than the thickness of the flexible printed circuit board.

The liquid crystal display device further includes an adhesion member positioned between the bottom chassis and the backlight assembly and adhering the bottom chassis and the backlight assembly together, and the adhesion member may be adhered to portions of the inner surface of the bottom chassis other than the portions where the projection is formed. Herein, the height of the projection may be set to be the same as or smaller than the thickness of the adhesion member.

The projection may be formed in plural on the inner surface of the bottom chassis. Herein, the projection may be formed in a stripe shape, and the extension direction of the stripe is parallel to one of intersection lines formed by rims formed on the periphery of the inner surface of the bottom chassis and the inner surface of the bottom chassis.

In another embodiment of the present invention, the projection may be formed in a shape where a plurality of coins are arranged on the inner surface of the bottom chassis in a matrix shape, and the plurality of coins are arranged into a predetermined number of rows and a predetermined number of columns with predetermined distances between each of the plurality of coins.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 10 is a perspective view showing a bottom chassis of an improved LCD device constructed as still another embodiment of the present invention.

DETAILED DESCRIPTION OF THE INVENTION

Figure 1:
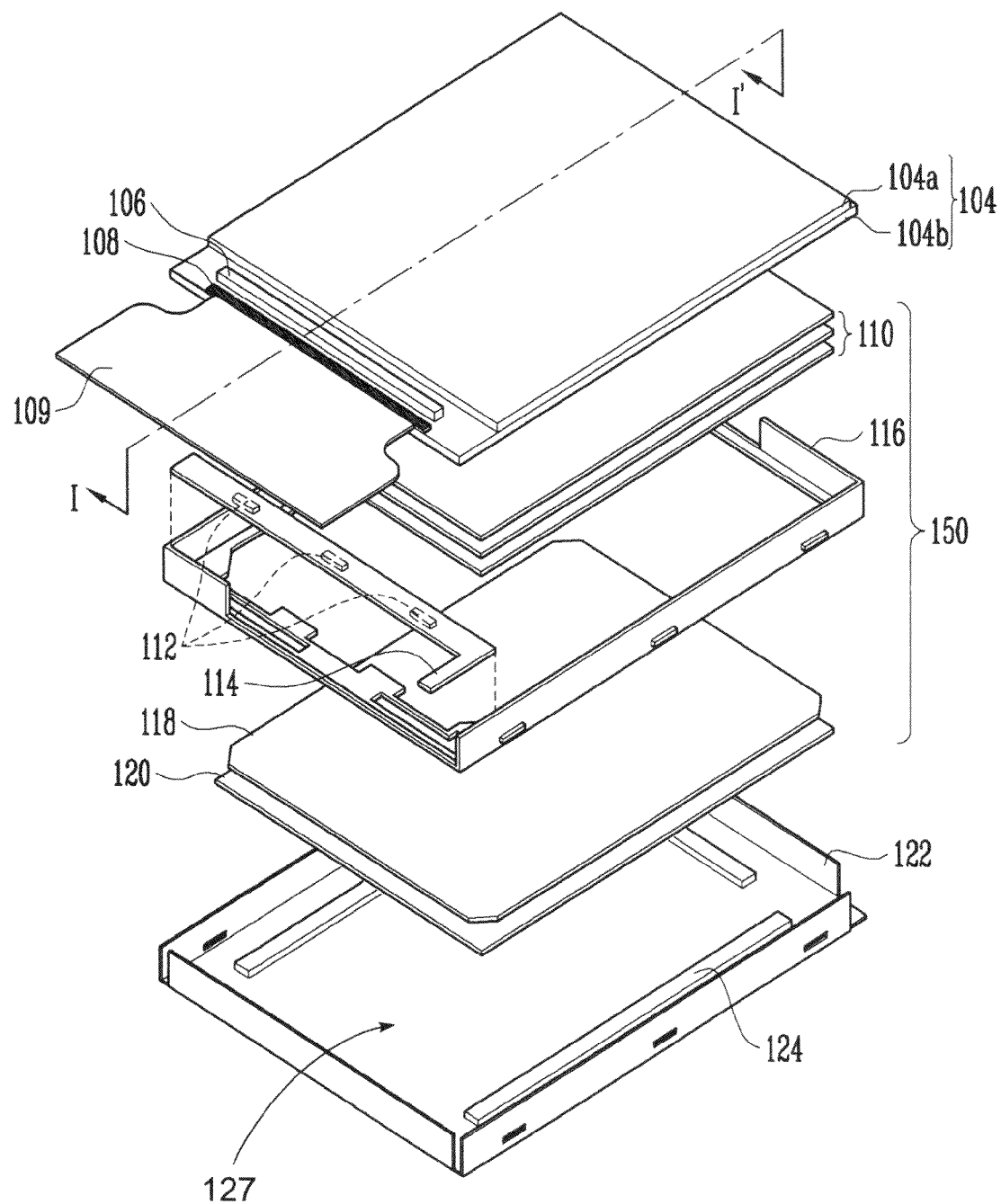
FIG. 1 is an exploded perspective view of a contemporary liquid crystal display device.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thoroughly and complete, and will fully convey the scope of the invention to those skilled in the art.

In the figures, the dimensions of layers and regions may be exaggerated for clarity of illustration. It will also be understood that when a layer or an element is referred to as being "on" another layer, element or substrate, it can be directly on the other layer, element or substrate, or intervening layers or elements may also be present. Further, it will be understood that when a layer or an element is referred to as being "under" another layer or element, it can be directly under, or one or more intervening layers or elements may also be present. In addition, it will also be understood that when a layer or an element is referred to as being "between" two layers or elements, it can be the only layer or element between the two layers or elements, or one or more intervening layers or elements may also be present. Like reference numerals refer to like elements throughout.

Hereinafter, exemplary embodiments constructed according to the present invention will be described in details with reference to the accompanying drawings.

Figure 2:
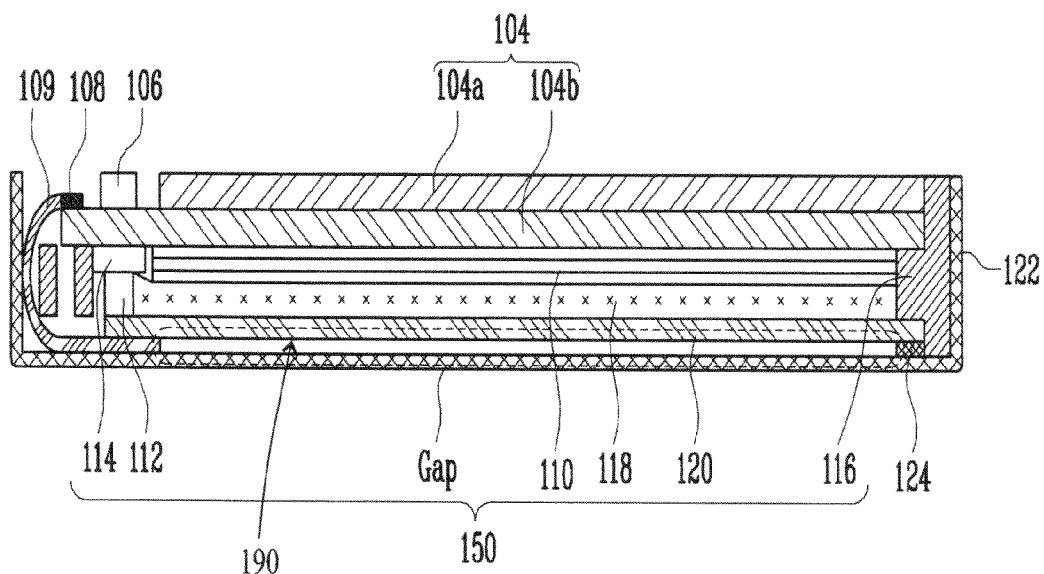
FIG. 2 is a cross-sectional view of an assembled contemporary LCD taken along line I-I' of FIG. 1.

FIG. 1 is an exploded perspective view of a contemporary liquid crystal display device; and FIG. 2 is a cross-sectional view of an assembled contemporary LCD taken along line I-I' of FIG. 1.

Referring to FIGS. 1 and 2, the liquid crystal display device includes a liquid crystal display panel 104, a backlight assembly 150, and a bottom chassis 122.

Liquid crystal display panel 104 includes a first substrate 104a, a second substrate 104b, and a liquid crystal (not shown) injected therebetween, and an integrated circuit 106 is positioned on one side of second substrate 104b. Integrated circuit 106 controls images displayed on liquid crystal display panel 104 corresponding to the control signal supplied by a flexible printed circuit board 109 which is connected to LCD panel 104 through a pad 108. Flexible printed circuit board 109 and pad 108 are electrically connected.

Flexible printed circuit board 109 may be mounted with various circuit devices (not shown) or is electrically coupled to another printed circuit board (not shown) to supply a control signal and/or an electrical power to liquid crystal display panel 104 and integrated circuit 106. Flexible printed circuit board 109 mounted to pad 108 formed on one side of liquid crystal display panel 104, as shown in FIG. 2, is curved to be extended from pad 108 to inner surface 127 of bottom chassis 122.

Backlight assembly 150 supplies lights to liquid crystal display panel 104. Here, backlight assembly 150 includes light emitting diodes 112, a light guide plate 118, a reflection plate 120, optical sheets 110, and a mold frame 116.

Light emitting diodes 112, which are a light source for a liquid crystal display device, are mounted on and electrically connected to a light emitting diode substrate 114 formed in a chip shape. Such light emitting diodes 112 generate a predetermined brightness of light corresponding to a driving signal applied to light emitting diode substrate 114.

Light guide plate 118 is positioned against light emitting diodes 112 to supply lights from light emitting diodes 112 to liquid crystal display panel 104. In other words, light guide plate 118 is positioned at one side of light emitting diodes 112 while LCD panel 104 is positioned at the other side of the light emitting diodes 112, and the 118 supplies the lights from light emitting diodes 112 to LCD panel 104 alighted with light guide plate 118. Here, the thickness of the light entrance part of light guide plate 118 may be set larger than or identical to the thickness of the light emitting diode 112, in order to prevent light-leakage and hot-spot.

Reflection plate 120 is aligned with light guide plate 118 and positioned as the outer layer of backlight assembly 150, and the outer layer has the greatest distance from the LCD panel 104 among other layers of backlight assembly 150. And reflection plate 120 therefore is able to reflect the incident light from light guide plate 118 back to light guide plate 118. In other words, reflection plate 120 is disposed as a constituent having the greatest distance from LCD panel 104 among the constituents of backlight assembly 150 and thus supplies incident lights from the interior of backlight assembly 150 back to backlight assembly 150, thereby improving light efficiency of the LCD device.

Optical sheets 110 may improve brightness and other related optical characteristics of the lights supplied from light guide plate 118 and supply the improved lights to liquid crystal display panel 104.

Mold frame 116 receives liquid crystal display panel 104 and backlight assembly 150. More specifically, mold frame 116 receives liquid crystal display panel 104, light emitting diode substrate 114 mounted with light emitting diode 112, light guide plate 118, reflection plate 120, and optical sheets 110, etc.

Bottom chassis 122 is aligned to liquid crystal display panel 104 and backlight assembly 150 disposed and is disposed as the outer layer of the LCD device, with the outer layer has the greatest distance away from liquid crystal display panel 104. Bottom chassis 122 receives liquid crystal display panel 104 and backlight assembly 150. Inner surface 127 of bottom chassis 122 is adhered to an adhesion member 124, and adhesion member 124 is positioned between bottom chassis 122 and backlight assembly 150 in order to adhere bottom chassis 122 and backlight assembly 150 together.

If the aforementioned liquid crystal display device is assembled, as shown in FIG. 2, a gap 190 is formed between backlight assembly 150 and bottom chassis 122.

More specifically, adhesion member 124 for adhering backlight assembly 150 to inner surface 127 of bottom chassis 122, and/or part of flexible printed circuit board 109 may be inserted between backlight assembly 150 and inner surface 127 of bottom chassis 122. Therefore, in view of a module structure of a liquid crystal display device, gap 190 is formed between backlight assembly 150 and bottom chassis 122.

Therefore, the rigidity of the liquid crystal display device may be weakened. In particular, when an external load is intensively applied to a portion of the liquid crystal display panel 104 corresponding to area where gap 190 exists, liquid crystal display panel 104 is not effectively supported so that the rigidity of the liquid crystal display device may be generally weakened. For example, the first substrate and the second substrate of LCD panel 104 may be easily broken.

Therefore, the present invention proposes an improved structure of bottom chassis of LCD device in which a projection is formed to supplement gap 190 and thus the rigidity of the LCD device is reinforced.

Figure 3:
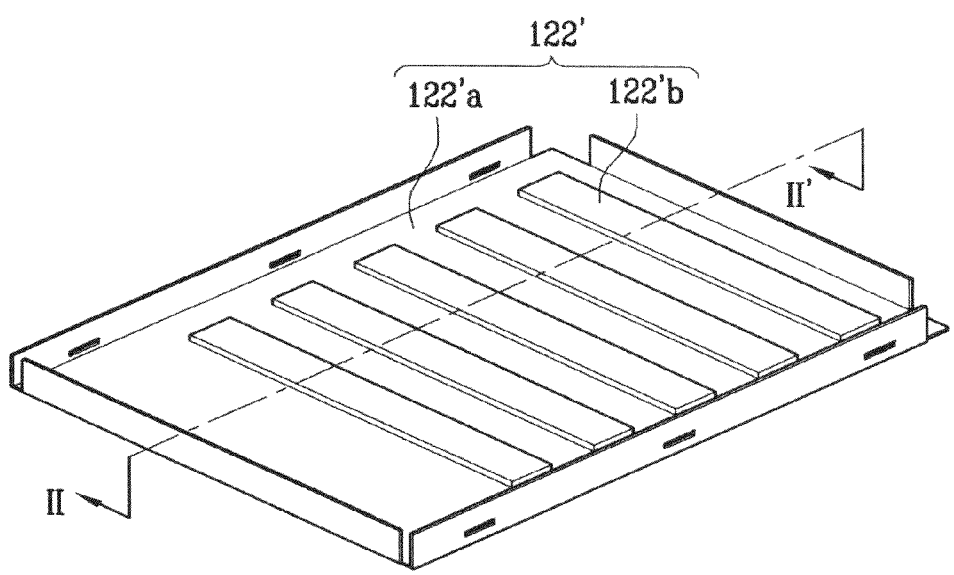
FIG. 3 is a perspective view showing a bottom chassis constructed according to an embodiment of the present invention.
Figure 4:
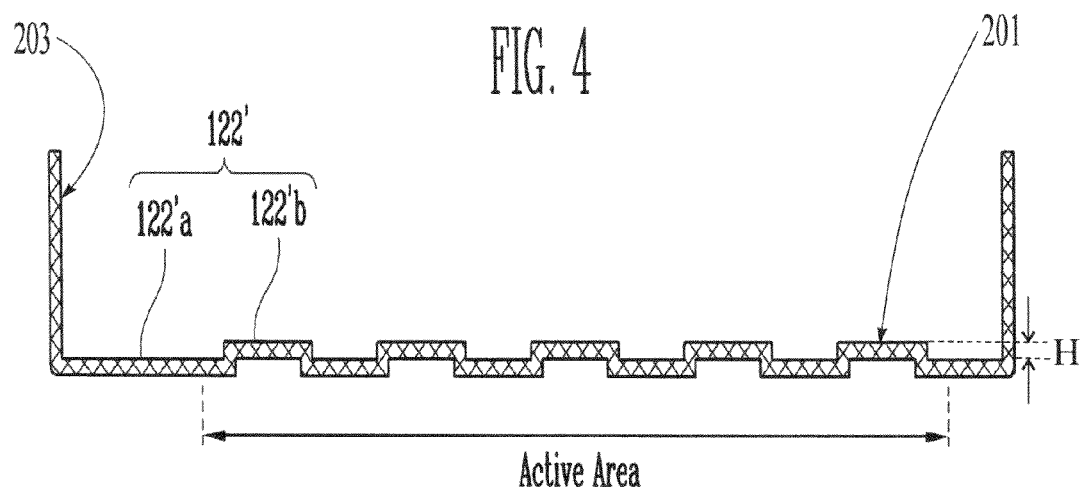
FIG. 4 is a cross-sectional view taken along line II-II' of FIG. 3.
Figure 5:
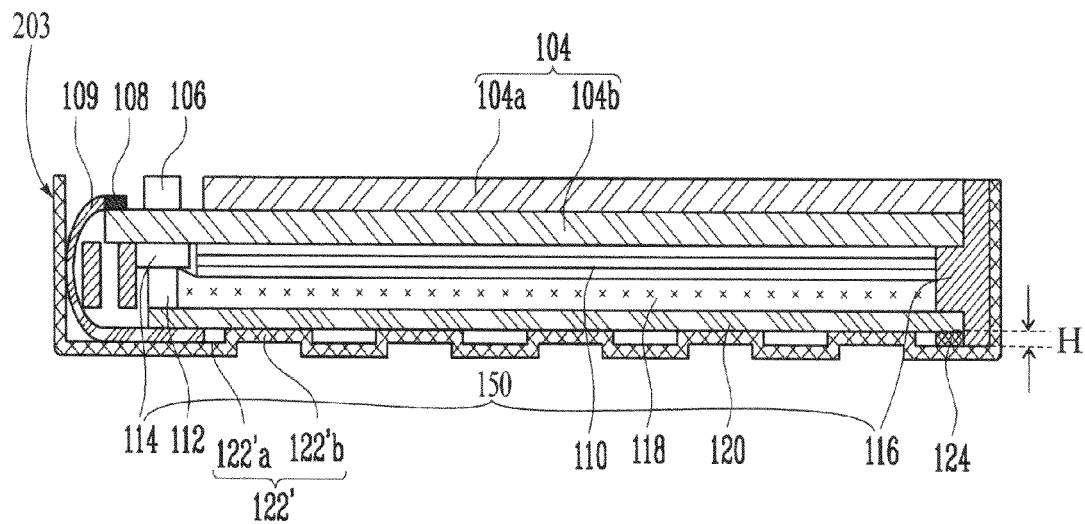
FIG. 5 is a cross-sectional view of an improved liquid crystal display device adopting the bottom chassis of FIGS. 3 and 4 constructed as one embodiment of the present invention.

FIG. 3 is a perspective view showing a bottom chassis constructed according to an embodiment of the present invention; FIG. 4 is a cross-sectional view taken along lines II-II' of FIG. 3; and FIG. 5 is a cross-sectional view of an improved liquid crystal display device adopting the bottom chassis of FIGS. 3 and 4 constructed according to one embodiment of the present invention. For FIG. 5, like parts as FIG. 2 will be given with like reference numerals and the detailed explanation thereof will be omitted.

Referring to FIGS. 3 to 5, bottom chassis 122' constructed according to the embodiment includes a plurality of projection 122'b projected from inner surface 122'a towards liquid crystal display panel 104 and backlight assembly 150.

Herein, projection parts 122'b, which supplements gap 190 formed between backlight assembly 150 and inner surface 27 of the bottom chassis as shown in FIG. 2, are formed by molding the area where gap 190 exists as shown in FIG. 2. In other words, at least one portion of bottom chassis 122' corresponding to an active area (as shown in FIG. 4) of liquid crystal display panel 104, is formed in a ruggedness shape.

When upper surfaces 201 of projection 122'b are formed to contact to the constituent (for example, a reflection plate 120) disposed on the outer layer having the greatest distance away from LCD panel among the constituents of backlight assembly 150, projection parts may most effectively support liquid crystal display panel 104 and backlight assembly 150.

Here, the height of projection parts 122'b, H, may be set approximately same as the height (or, thickness) of a flexible printed circuit board 109 partially inserted from edge portion of inner surface 122'a into the gap between inner surface 122'a and backlight assembly 150 and/or the thickness of adhesion member 124.

The present invention is however not limited thereto, and the height of projection 122'b may be set lower than the height (or, thickness) of flexible printed circuit board 109 and/or the thickness of adhesion member 124.

When the heights of projections 122b' are set to be higher than the thickness of adhesion member 124, adhesion member 124 cannot effectively adhere backlight assembly 150 to bottom chassis 122' so that projection 122'b may be exemplarily set not to be higher than adhesion member 124.

Also, the height (or, thickness) of adhesion member 124 is usually set to be approximately same as the thickness of flexible printed circuit board 109 in order to mount liquid crystal display panel 104 and backlight assembly 150 within bottom chassis 122 in a horizontal level.

In other words, it is exemplary that the height of projections 122'b is set to be approximately same as or smaller than the thickness of the adhesion member 124 and/or the thickness of flexible printed circuit board 109.

Thereby, liquid crystal display panel 104 and the backlight assembly 150 may effectively be supported by the bottom chassis 122' having projections 122' b, by not weakening the adhesive force between backlight assembly 150 and bottom chassis 122'.

Here, flexible printed circuit board 109 and the adhesion member 124 are disposed not to be overlapped with the projection part 122'b in order to allow a module to be safely disposed, while space is maximally utilized, and the thickness of the liquid crystal display device may not be increased.

Projections 122'b of the aforementioned bottom chassis 122' may be formed in various shapes, for example in a stripe shape as shown in FIGS. 3 to 5. The extension direction of the stripes are parallel to one of intersection lines formed by rims 203 formed at the periphery of the inner surface of the bottom chassis and the inner surface of the bottom chassis as shown in FIG. 4, and the protruding direction of projections 122' b are defined parallel to the extruding directions of rim 203 formed at periphery of inner surface 127.

According to the embodiment as described above, a plurality of projection 122'b are formed on inner surface 127 of bottom chassis 122' in order to supplement the gap between backlight assembly 150 and bottom chassis 122', so that when static loads are applied to liquid crystal display panel 104 as well as when an operative impact such as falling is applied to liquid crystal display panel 104, the effect given to the liquid crystal display panel 104 by the external impacts may be dramatically reduced. Thereby, the possibility of breakage of liquid crystal display panel 104 may be reduced or even eliminated and the rigidity of the liquid crystal display device may be significantly improved.

Figures 6, 7:
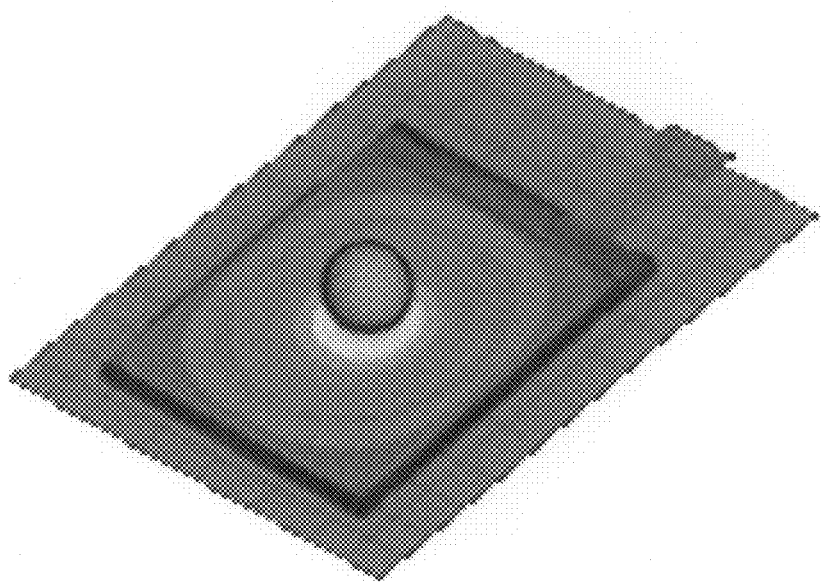
FIG. 6 is a graph showing an experimental method for measuring breaking load against a static load applied to the improved liquid crystal display device constructed as one embodiment of the present invention.
FIG. 7 is a table showing results of experimental measurements measuring load under which the liquid crystal display devices of FIGS. 2 and 5 are broken respectively in order to show the increased rigidity of the improved LCD device as shown in FIG. 5 comparing with the contemporary LCD devices.

FIG. 6 is a graph showing an experimental method for measuring breaking load against a static load applied to the improved liquid crystal display device; and FIG. 7 is a table showing results of experimental measurements measuring load under which the liquid crystal display devices of FIGS. 2 and 5 are broken respectively in order to show the increased rigidity of the improved LCD device as shown in FIG. 5 comparing with the contemporary LCD devices.

Referring to FIGS. 6 and 7, the diagonal line of liquid crystal display device is 2-inch liquid crystal display device. In other words, the size of display area of the liquid crystal display device is 30.6 mm (millimeter) in width and 40.8 mm in length. And, five of projection parts are formed in a stripe shape on the inner surface of the bottom chassis corresponding to the display area (i.e. active area) of the liquid crystal display device and are disposed with an equal interval between each other, with the size of each stripe shape is set to be 30.6 mm in length, 2.6 mm in width, and 0.1 mm in height.

Referring to FIGS. 6 and 7, in a module state of the liquid crystal display device, as shown in FIG. 6, the symbolistic distributed loads on the liquid crystal display device are measured when the upper and/or lower substrate of the liquid crystal display panel is broken, while a static load being applied to a center part of the display area of the liquid crystal display panel within a spherical shape of a 5 mm radius. This graph does not show any absolute value of the distributed loads but only gives a symbolistic view of the distributed loads on the LCD devices under a certain external load as shown in FIG. 6.

Then, as shown in FIG. 7, it can be measured that in the liquid crystal display device without any projections on the inner surface of the bottom chassis, the liquid crystal display panel is broken under the load of 25.14 (Newton). On the other hand, in the liquid crystal display device having five projections in stripe shape on the inner surface of the bottom chassis, the liquid crystal display panel is broken under the load of 30.39 (Newton). In other words, it may be confirmed that the rigidity of LCD device is increased by 20.8% by forming projections on the inner surface of the bottom chassis comparing to the contemporary LCD device without any projections on the inner surface of the bottom chassis.

Figures 8, 9:
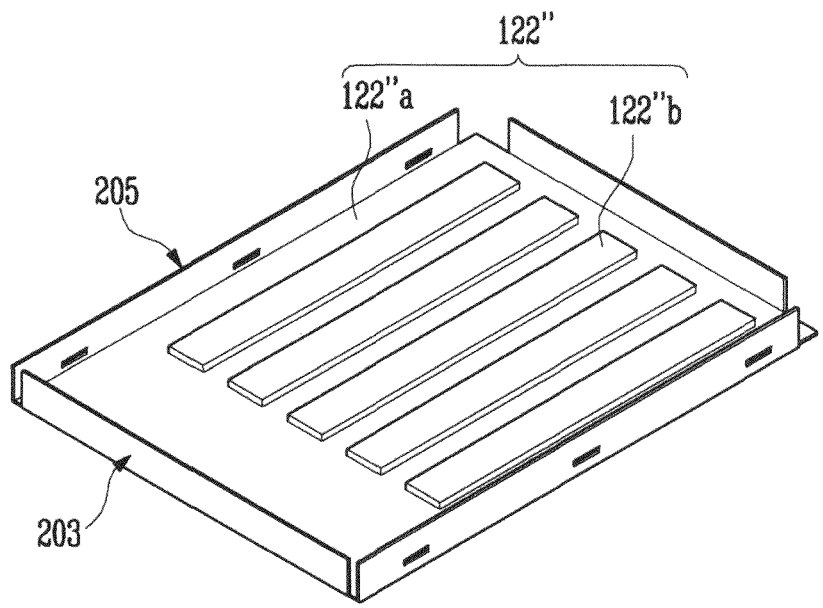
FIG. 8 is a table showing experimental results of stress distributions measured in different parts of liquid crystal display panels when the respective liquid crystal display devices of FIGS. 2 and 5 fall from a same height in order to show the improved rigidity against external impacts in the improved LCD device.
FIG. 9 is a perspective view showing a bottom chassis of an improved LCD device constructed as another embodiment of the present invention.

FIG. 8 is a table showing experimental results of stress distributions measured in different parts of liquid crystal display panels when the respective liquid crystal display devices of FIGS. 2 and 5 fall from a same height in order to show the improved rigidity against external impact in the improved LCD device.

In FIG. 8, the module size of the liquid crystal display device is set to be the same as the experimental conditions of FIGS. 6 and 7, and the falling height thereof is set to be 1.5 m.

Referring to FIG. 8, it can be appreciated that when the liquid crystal display devices of FIGS. 2 and 6 fall from the same height in a module state, the stress values measured from each part of the liquid crystal display panels are remarkably reduced in the liquid crystal display device formed with projection(s). In other words, it can be appreciated that the breaking characteristics of the liquid crystal display panel with projection(s) is improved according to the reduction in distributed stress under certain external impacts.

Additionally, when calculating the rigidity increasing rate by using the ratio of distributed stress values, it can be confirmed that the rigidity of the liquid crystal display device is effectively reinforced due to the formation of the projection part.

Meanwhile, the shape of the projection part constructed according to the present invention may not be limited to a stick shape viewed from a horizontal direction as shown in FIGS. 3 to 5, but may be varied without deviating the principle of the present invention.

For example, as shown in FIG. 9, projections 122"b in a stripe shape may be formed on inner surface 122"a of a bottom chassis 122" with the extension direction of the stripes parallel to the intersection line formed by rim 205 and inner surface 122" a which is perpendicular to the intersection line formed by rim 203 and inner surface 122"; and, as shown in FIG. 10, projections 122'''b may be formed in a flat cylinder shape, for example, in a coin shape, the projections may be arranged on inner surface 122''' a of bottom chassis 122''' in a matrix, and the plurality of coins are arranged into the matrix having a predetermined number of rows of coins and a predetermined number of columns of coins with predetermined distances between each of the coins.

Also, although not shown, the shape of the projection part can variously be set, for example, constituting the projections in a mesh type by molding the bottom surface of the bottom chassis in a ruggedness-shape of horizontal and vertical directions, and constituting the projection part in a shape where concentric circles are arranged, and so on. It is important to be noticed that the shape and arrangement of the projections should not be limited by the examples given above, but may be varied without deviating the principle of the present invention.

With the present invention, by forming the projection part on the bottom surface of the bottom chassis, a gap between the backlight assembly and the bottom chassis may be supplemented. Thereby, when the liquid crystal display panel received in the upper of the bottom chassis is applied by an external load or the liquid crystal display device falls, the improved LCD of the present invention may relieve the impact given to the liquid crystal display panel and improve the rigidity of the liquid crystal display device. Also, although the liquid crystal display device is described in the aforementioned description of the present invention by way of example, the technical idea of the present invention is not limited thereto. For example, when reinforcing rigidity by forming a projection on an inner surface of a bottom chassis receiving an organic light emitting display panel, etc., based on the technical idea of the present invention, the present invention can undoubtedly be applied thereto.

Although exemplary embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A liquid crystal display device, comprising: a liquid crystal display panel and a backlight assembly;
a bottom chassis disposed to receive the liquid crystal display panel and the backlight assembly,
the bottom chassis comprising a bottom surface comprising a projection projecting from the bottom surface of the bottom chassis towards the liquid crystal display panel and the backlight assembly, with the projection being disposed within a display area of the liquid crystal display panel; and
a flexible printed circuit board electrically connected with a pad formed on one portion of the liquid crystal display panel being curved to be extended from the pad to the inner surface of the bottom chassis, and the flexible printed circuit board being disposed without overlapping with the projection, with a height of the projection being either the same as or smaller than a thickness of the flexible printed circuit board.

2. The liquid crystal display device as claimed in claim 1, in which the projection is formed on a portion of the inner surface of the bottom chassis corresponding to a display area of the liquid crystal display panel.

3. The liquid crystal display device as claimed in claim 1, in which the projection further comprises an upper surface immediately physically contact to a constituent of the backlight assembly, with the constituent being disposed with the greatest distance from the liquid crystal display panel among constituents of the backlight assembly.

4. The liquid crystal display device as claimed in claim 1, further comprising:
an adhesion member positioned between the bottom chassis and the backlight assembly and adhering the bottom chassis and the backlight assembly, and the adhesion member being adhered to areas of the inner surface of the bottom chassis other than areas where the projection is formed.

5. The liquid crystal display device as claimed in claim 4, with the height of the projection being the same as or smaller than a thickness of the adhesion member.

6. The liquid crystal display device as claimed in claim 1, in which more than one projection being formed on the inner surface of the bottom chassis.

7. The liquid crystal display device as claimed in claim 6, in which the projection is formed in a stripe shape.

8. The liquid crystal display device as claimed in claim 7, in which an extension direction of the stripe is parallel to one of intersection lines formed by rims formed at periphery of the inner surface of the bottom chassis and the inner surface of the bottom chassis.

9. The liquid crystal display device as claimed in claim 6, in which the projection is formed in a coin shape.

10. The liquid crystal display device as claimed in claim 9, in which the more than one projection formed in the coin shape are arranged on the inner surface of the bottom chassis in a matrix, with the matrix having a predetermined number of rows of coins and a predetermined number of columns of coins and predetermined distances being arranged between each of the coins.

11. The liquid crystal display device of claim 2, in which the projection comprises a protrusion protruding from the inner surface of the bottom chassis and a recess recessed from an outer surface of the bottom chassis, and the recess is disposed corresponding to the protrusion.

12. The liquid crystal display device of claim 11, in which the projection is spaced apart from peripheral walls of the bottom chassis.

* * * * *